(12) United States Patent
Mujtaba et al.

(10) Patent No.: US 10,165,599 B2
(45) Date of Patent: Dec. 25, 2018

(54) RANDOM ACCESS PROCEDURES FOR LINK BUDGET CONSTRAINED WIRELESS DEVICES

(71) Applicant: Apple Inc., Cupertino, CA (US)

(72) Inventors: Syed Aon Mujtaba, Santa Clara, CA (US); Tarik Tabet, Los Gatos, CA (US); Awais M. Hussain, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 15/153,931

(22) Filed: May 13, 2016

(65) Prior Publication Data

US 2016/0366705 A1    Dec. 15, 2016

Related U.S. Application Data

(60) Provisional application No. 62/173,773, filed on Jun. 10, 2015.

(51) Int. Cl.
   *H04W 72/04*   (2009.01)
   *H04W 74/08*   (2009.01)
   *H04W 74/00*   (2009.01)

(52) U.S. Cl.
   CPC ..... *H04W 74/0833* (2013.01); *H04W 72/048* (2013.01); *H04W 72/0413* (2013.01); *H04W 72/0446* (2013.01); *H04W 74/002* (2013.01)

(58) Field of Classification Search
   CPC . H04W 4/005; H04W 72/02; H04W 72/0453; H04W 88/04; H04W 8/005; H04W 24/02; H04W 28/048; H04W 40/16; H04W 40/20; H04W 52/245; H04W 52/30; H04W 72/04
   See application file for complete search history.

(56) References Cited

U.S. PATENT DOCUMENTS

| | | | |
|---|---|---|---|
| 8,199,778 B2 | 6/2012 | Shimomura et al. | |
| 2012/0320842 A1 | 12/2012 | Jeong et al. | |
| 2014/0241285 A1 | 8/2014 | Pang et al. | |
| 2014/0354226 A1* | 12/2014 | Draaijer | G06F 1/1632 320/108 |
| 2015/0180695 A1* | 6/2015 | Hashizume | H04L 5/0044 370/329 |
| 2015/0365977 A1 | 12/2015 | Tabet et al. | |
| 2016/0014810 A1 | 1/2016 | Tabet et al. | |
| 2016/0119739 A1* | 4/2016 | Hampel | H04B 7/14 370/315 |
| 2016/0183243 A1* | 6/2016 | Park | H04W 72/0413 370/329 |
| 2016/0338109 A1* | 11/2016 | Rahman | H04W 74/0833 |
| 2017/0171764 A1* | 6/2017 | Dimou | H04W 24/02 |

* cited by examiner

*Primary Examiner* — Sai Aung
(74) *Attorney, Agent, or Firm* — Meyertons Hood Kivlin Kowert & Goetzel, P.C.; Jeffrey C. Hood

(57) ABSTRACT

This disclosure relates to accommodating link budget constrained wireless devices performing random access procedures. A base station may detect a preamble message from a wireless device. It may be determined that the preamble message is received from a link budget constrained wireless device. Characteristics of a response message may be selected based at least in part on determining that the preamble message is received from a link budget constrained wireless device. The response message may be transmitted to the link budget constrained wireless device using the selected characteristics.

20 Claims, 5 Drawing Sheets

RRC Connection Request Information Element

```
RRCConnectionRequest-r8-IEs ::=    SEQUENCE {
    ue-Identity                        InitialUE-Identity,
    establishmentCause                 EstablishmentCause
    spare                              BIT STRING (SIZE (1))
}

InitialUE-Identity ::=    CHOICE {
    S-TMSI,
    randomValue            BIT STRING (SIZE (40))
}

EstablishmentCause ::=    ENUMERATED {
    emergency, highPriorityAccess, mt-Access, mo-Signaling,
    mo-Data, spare3, spare2, spare1}

-- ASN1STOP,
```

FIG. 7

RANDOM ACCESS PROCEDURES FOR LINK BUDGET CONSTRAINED WIRELESS DEVICES

PRIORITY INFORMATION

This application claims priority to U.S. provisional patent application Ser. No. 62/173,773, entitled "Random Access Procedures for Link Budget Constrained Wireless Devices," filed Jun. 10, 2015, which is hereby incorporated by reference in its entirety as though fully and completely set forth herein.

FIELD

The present application relates to wireless devices, including to systems, apparatuses, and methods for link budget limited wireless devices to perform random access procedures.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Wireless communication can be useful for a wide breadth of device classes, ranging from relatively simple (e.g., potentially inexpensive) devices which may have limited capabilities, to relatively complex (e.g., potentially more expensive) devices which may have greater capabilities. Such devices may have different characteristics with respect to processing, memory, battery, antenna (power/range, directionality), and/or other capabilities. Devices which exhibit relatively limited reception and/or transmission capabilities (due to device design, current transmission medium conditions, and/or other factors) may be referred to in some instances as "link budget limited" or "link budget constrained" devices.

SUMMARY

Embodiments are presented herein of apparatuses, systems, and methods for link budget limited devices to perform random access procedures.

Random access procedures (RACH procedures) between a wireless device and a base station may include exchanging a sequence of messages between the wireless device and the base station. At least in some instances, the messages may include a physical preamble (PRACH or MSG1), a random access response (RAR or MSG2), a connection request (MSG3), and a contention resolution message (MSG4).

According to the techniques described herein, a base station may detect physical preamble messages (MSG1s) transmitted by link budget limited devices using a different (e.g., lower) correlation threshold than is used for non-link budged limited devices. If a physical preamble message corresponding to a link budget limited device is detected, the base station may select the MSG2 characteristics based on the device to which the MSG2 will be sent being link budget limited. For example, a high control channel aggregation level may be used, the relevant control channel elements (CCEs) may be boosted in power, and/or a low modulation and coding scheme (possibly also with power boosting) may be selected. This may improve the likelihood that a link budget limited device (e.g., which may lack receiver diversity, and/or may be at the cell edge) can successfully receive the MSG2.

Furthermore, at least in some instances, the base station may indicate to such a link budget limited wireless device to utilize transmission characteristics for the MSG3 based on the device being link budget limited. For example, the wireless device may be provided with a low modulation and coding scheme, and/or may be instructed to use transmission time interval bundling (TTI-B) for the MSG3. As another possibility, the wireless device may explicitly indicate that it is link budget constrained in the MSG3, if desired.

The techniques described herein may be implemented in and/or used with a number of different types of devices, including but not limited to cellular base stations, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which:

FIG. 7 illustrates an exemplary radio resource control connection request information element that could be used as part of a random access procedure, according to some embodiments.

Figure 1:
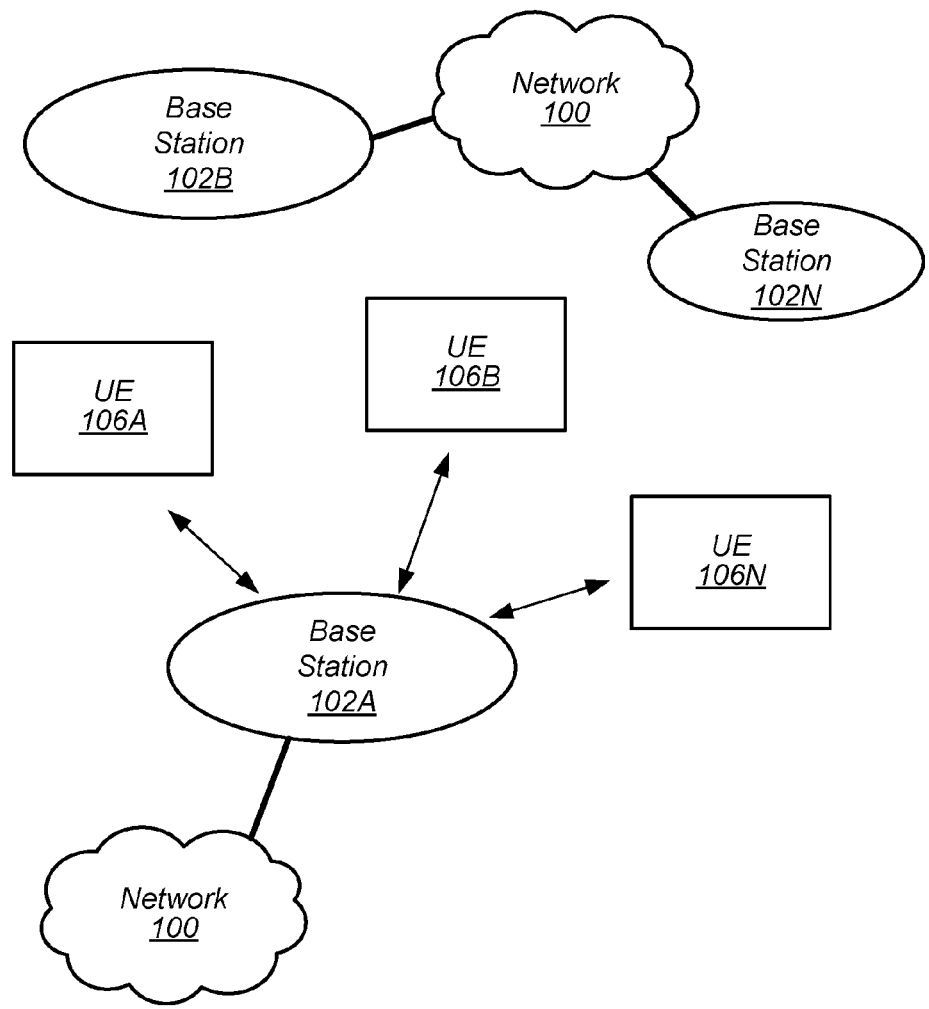
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Base Station—The term "Base Station" has the full breadth of its ordinary meaning, and at least includes a wireless communication station installed at a fixed location and used to communicate as part of a wireless telephone system or radio system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
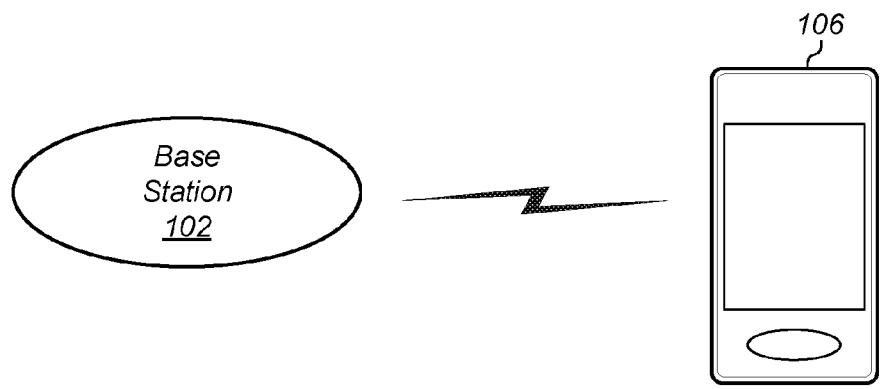
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE device 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
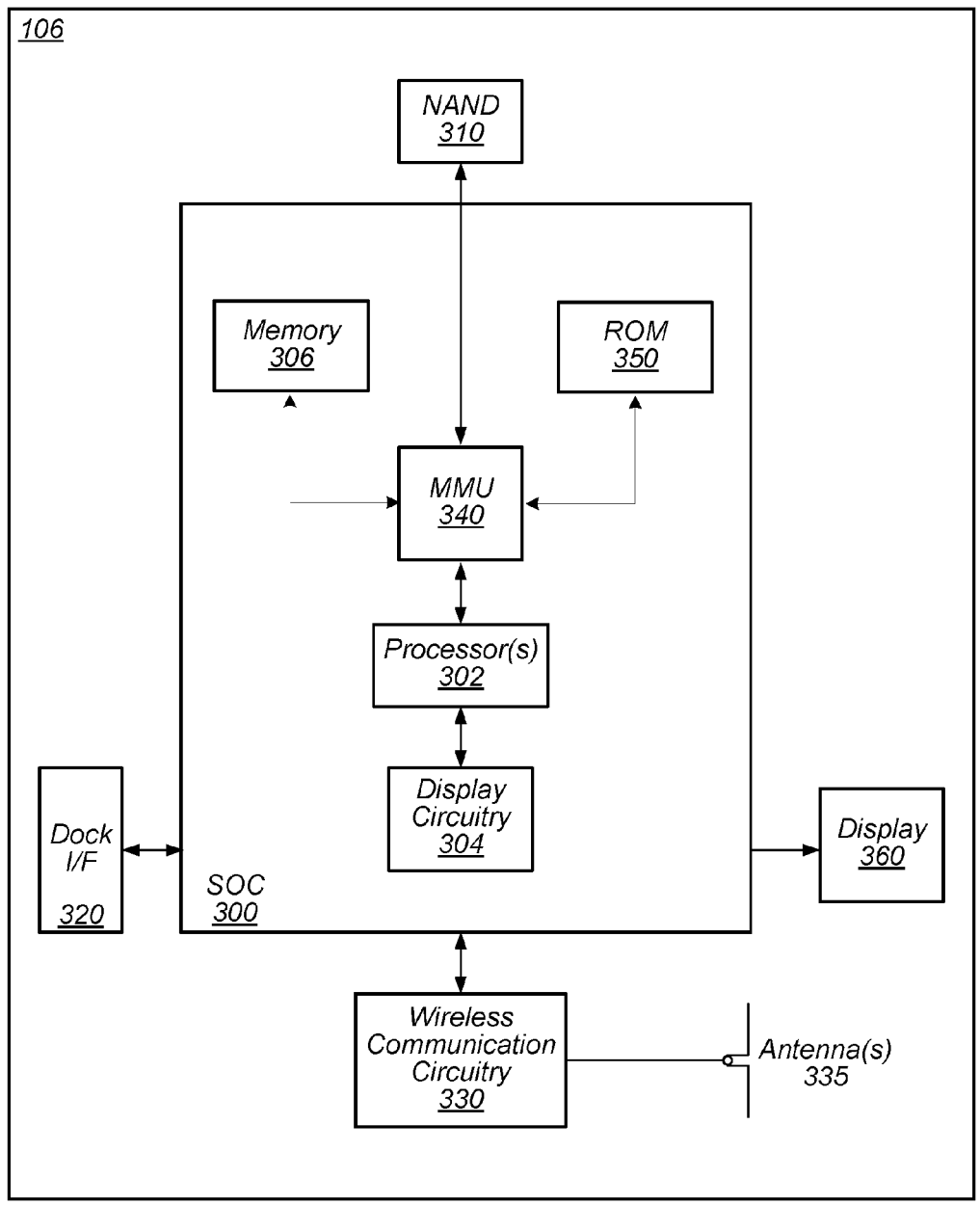
FIG. 3 illustrates an exemplary block diagram of a UE device, according to some embodiments.

FIG. 3—Exemplary Block Diagram of a UE Device

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302, which may execute program instructions for the UE 106, and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features described herein, such as those described herein with reference to, inter alia, FIG. 6. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 6.

Figure 4:
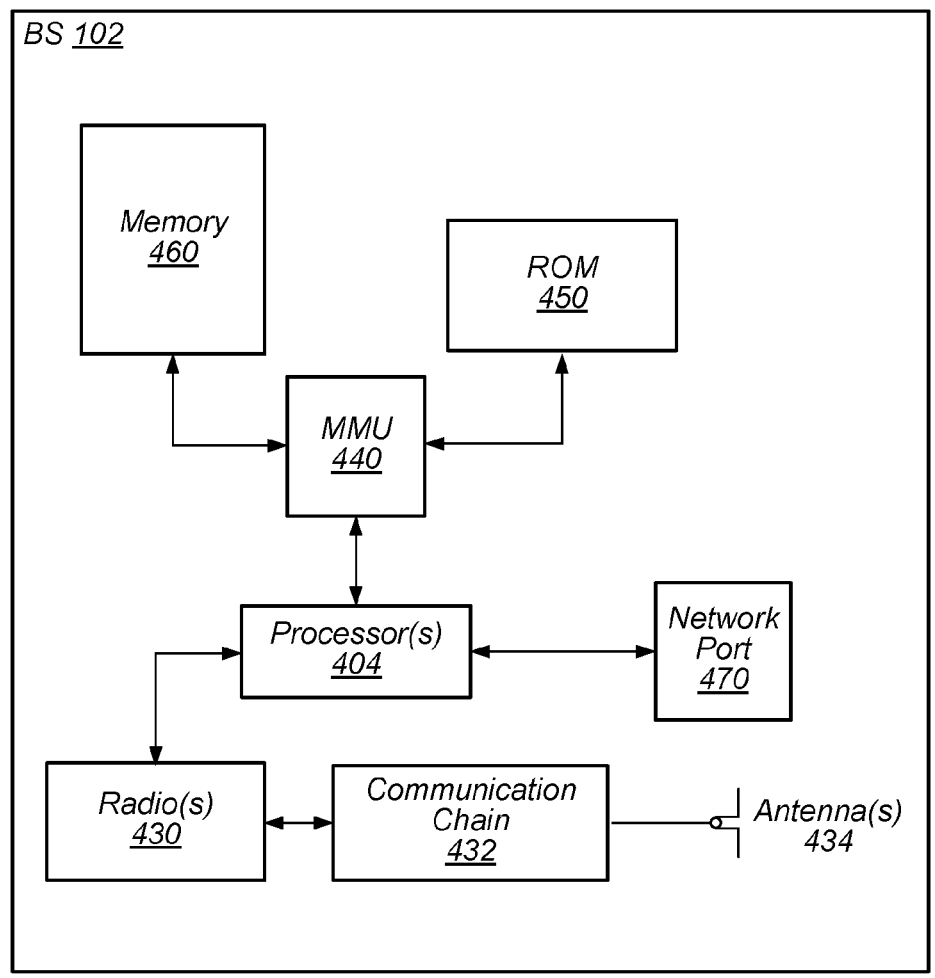
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

Figure 6:
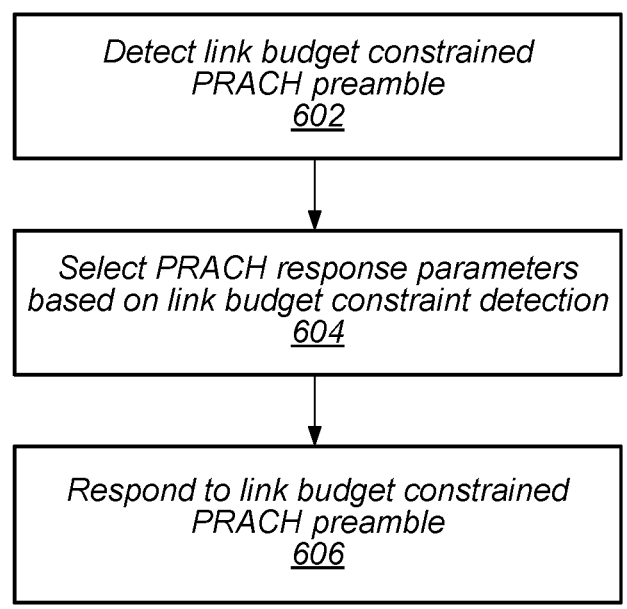
FIG. 6 is a flowchart diagram illustrating an exemplary method for accommodating link budget limited random access procedures, according to some embodiments.

The BS 102 may include hardware and software components for implementing or supporting implementation of features described herein, such as those described herein with reference to, inter alia, FIG. 6. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein, such as the features described herein with reference to, inter alia, FIG. 6.

Figure 5:
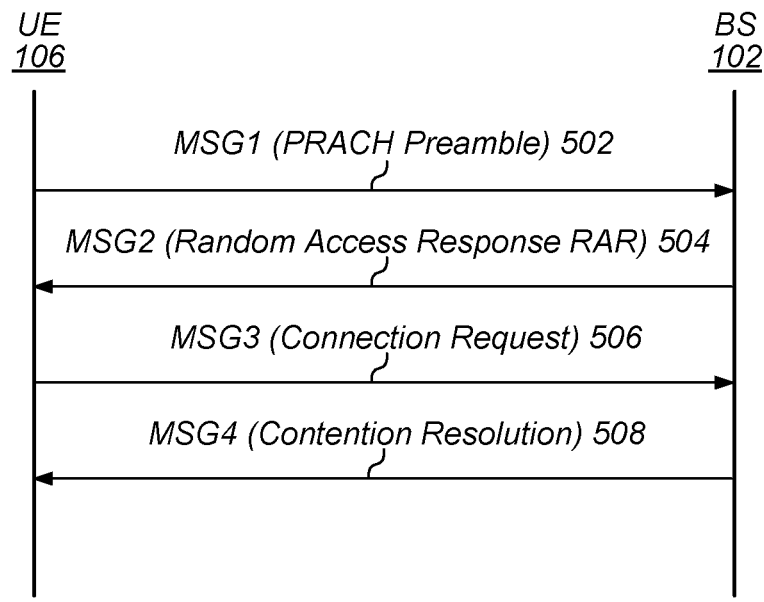
FIG. 5 illustrates an exemplary random access procedure message sequence, according to some embodiments.

FIG. 5—Exemplary RACH Procedure

In LTE, in order to initially register with a network and/or to establish a radio resource control (RRC) connection to exchange data, a wireless device may exchange a sequence of messages with a base station using a random access channel (RACH). Such a message exchange may also be referred to as a RACH procedure.

A RACH procedure may be a contention-based procedure for acquiring synchronization and establishing communication channels and/or radio links that provide access to more extensive network resources (e.g., data carrying channels and/or greater uplink/downlink bandwidth). For example, a UE may attempt to perform a RACH procedure in order to obtain an RRC connection, which may in turn be used to service an application data request, at least as one possibility.

FIG. 5 is a signal flow diagram illustrating an exemplary RACH procedure such as might be performed between a UE 106 and a base station 102 according to LTE. It should be noted while the exemplary details illustrated in and described with respect to FIG. 5 may be representative of one possible technique for initially attaching to a network and/or transitioning to connected mode, other techniques (e.g., according to other RATs) are also possible. Accordingly, the features of FIG. 5 are not intended to be limiting to the disclosure as a whole: numerous variations and alternatives to the details provided herein below are possible and should be considered within the scope of the disclosure.

As shown, in 502 the UE 106 may transmit a first message to the base station 102. The first message ("Msg1") may include a physical RACH (PRACH) preamble, which may function as or indicate a random access radio network temporary identifier (RA-RNTI). In some embodiments, the PRACH preamble may include one or more Zadoff-Chu (ZC) sequences, which the base station may detect using a correlation receiver.

In 504, the UE 106 may receive a second message from the base station 102. The second message ("Msg2", also referred to as "random access response" or "RAR") may include a timing advance (TA) parameter, a temporary cell radio network temporary identifier (TC-RNTI), and an uplink grant for transmitting a third message.

In 506, the UE 106 may transmit the third message to the base station 102. The third message ("Msg3", also referred to as "RRC connection request") may include the TC-RNTI and a system architecture evolution temporary mobile subscriber identity (S-TMSI) to identify the UE 106 to the base station 102.

In 508, the UE 106 may receive a fourth message from the base station 102. The fourth message ("Msg4" or "contention resolution message") may promote the TC-RNTI to a cell radio network temporary identifier (C-RNTI). The C-RNTI may be used for subsequent connected-mode RACH procedure attempts, among various uses, as desired.

Upon completion of the four message sequence, the UE 106 may be in a connected mode (e.g., RRC_connected) with the base station 102, and may perform network data exchange via its serving cell.

FIG. 6—Flowchart

As previously noted herein, a wireless device may attempt to perform a RACH procedure with a base station to initially register with a network and/or to establish a RRC connection with the base station providing a serving cell. Accordingly, in order to facilitate cell access by devices (e.g., range constrained devices and/or those in poor RF conditions) that have limited link budgets, particularly as demand grows for inexpensive and limited capability devices, it may be desirable to provide mechanisms to improve the abilities of such devices to succeed when attempting to perform a RACH procedure.

FIG. 6 is a flowchart diagram illustrating a method for a base station to detect when a link budget constrained wireless device is attempting to perform a RACH procedure, and to select characteristics of follow up messages based on this information, which may improve the chances of success for a RACH procedure by the link budget constrained wireless device. Note that while elements of the method of FIG. 6 are described substantially with reference to the LTE wireless communication technology, part or all of the method may be used in conjunction with other wireless communication technologies, as desired.

The method shown in FIG. 6 may be used in conjunction with any of the computer systems or devices shown in the above Figures, among other devices. In various embodiments, some of the elements shown may be performed concurrently, in a different order than shown, substituted for by other elements, or may be omitted. Additional elements may also be performed as desired. As shown, the method may operate as follows.

In 602, the base station may detect a PRACH preamble from a link budget constrained wireless device. As previously noted with respect to FIG. 5 herein, a PRACH preamble (or simply "PRACH") may, at least in some instances, include a ZC sequence. The base station may include a correlation receiver and may use any of various detection algorithms for detecting PRACH signals received by the base station. For example, ZC cross-correlation may be used to determine a signal's correlation level in order to perform Msg1 detection.

If a link budget limited wireless device transmits a PRACH, it may be the case that the PRACH correlation level is lower than PRACHs received from non-link budget limited devices. For example, link budget limitations may result from hardware limitations (e.g., power amplifier and/or antenna limitations, lack of receive diversity, etc.) and/or RF conditions (e.g., if the wireless device is at cell edge, in a shielded location, etc.) that may result in signals from such a device being received by the base station with lower signal strength (which may result in lower correlation level) than signals from other devices.

Thus, as one possibility for detecting that a PRACH is received from a link budget constrained wireless device, the base station may utilize multiple correlation thresholds for detecting incoming PRACHs. For example, incoming signals that meet a first (e.g., higher) correlation threshold may be determined to be received from devices which are not link budget limited, while incoming signals that do not meet the first correlation threshold but do meet a second (e.g., lower) correlation threshold may be determined to be received from devices which are link budget limited. Signals that fall below the second threshold may be determined to not correspond to incoming PRACHs (e.g., may be background noise and/or interference), and wireless devices transmitting such signals may not be detected.

Note that the correlation thresholds may be selected as desired. As one possibility, the first threshold may be selected to provide approximately (or less than) 1% probability of missed detection (PMD) and approximately (or less than) 0.1% probability of false alarm (PFA).

In 604, the base station may select PRACH response parameters/characteristics based on detecting that the PRACH is received from a link budget constrained wireless device. The PRACH response parameters may be associated with a message sent by the base station in response to the PRACH (e.g., the Msg2/RAR to be sent by the base station) and/or a subsequent message from the link budget constrained wireless device to the base station (e.g., the Msg3/RRC Connection Request). For example, in some embodiments, the base station may allocate and assign more resources to both the Msg2 and Msg3 if a link budget constrained Msg1 is detected, to improve the probability of correct detection of those messages.

The Msg2 parameters/characteristics may relate to either or both of a control channel (e.g., physical downlink control channel or PDCCH in LTE) and a data channel (e.g., physical downlink shared channel or PDSCH in LTE). For example, a control channel format and/or aggregation level may be selected based on detecting that the PRACH is received from a link budget constrained wireless device. Using a higher (e.g., maximum) aggregation level (e.g., format 3/aggregation level 8 in LTE, as one possibility) may increase the probability of a wireless device being able to decode the control channel. Additionally, or alternatively, the base station may boost the power for the relevant control channel elements (CCEs) of the control channel. As a still further possibility, the base station may select a low (e.g., the lowest possible) modulation and coding scheme (MCS) for the data channel on which the Msg2 is transmitted, possibly also with power boosting.

The Msg3 parameter(s)/characteristic(s) selected based on the PRACH being received from a link budget constrained wireless device may also include a MCS allocation. For example, a low (e.g., the lowest possible) MCS grant may be provided for the Msg3 for a link budget constrained wireless device. Additionally, or alternatively, the base station may determine that the link budget constrained wireless device should implement transmission time interval bundling (TTI-B) for the Msg3. Such parameter(s)/characteristic(s) may be indicated to the link budget constrained wireless device by the base station as part of the Msg2 transmitted by the base station, using any of a variety of possible signaling techniques. As one possibility, certain TC-RNTI values may be designated (e.g., specified in standard documents, and/or agreed upon by infrastructure and device vendors) for use with link budget limited devices, such that use of those TC-RNTI values is understood to specify the use of certain techniques such as TTI-B (e.g., at least for the Msg3). A base station could thus provide such a TC-RNTI in its Msg2/RAR to a wireless device that has been determined to be link budget constrained, based on which the wireless device may subsequently use TTI-B (and/or other specified techniques). Alternatively (or in addition), such parameter(s)/characteristic(s) may be indicated using RRC information elements (IEs) and/or media access control (MAC) control elements (CEs), among various possibilities.

As previously noted herein, link budget constraints may arise for any of multiple possible reasons. In some instances, the base station may be able to distinguish between different link budget constraint use-cases, and may further refine the RACH procedure parameter(s)/characteristic(s) selected depending on the reason a wireless device is link budget constrained.

For example, the base station may be able to compute the time of arrival (ToA) or round trip delay (RTD) for a wireless device based on the lag in the cross-correlation of the ZC sequence of a detected PRACH preamble. This may in turn allow the base station to determine if the wireless device is in a cell-edge scenario (e.g., if the ToA is later and/or RTD is larger than an associated threshold) or not (e.g., if the ToA is earlier and/or RTD is smaller than an associated threshold).

The base station may refine the RACH procedure parameter(s)/characteristic(s) selected depending on the reason a wireless device is link budget constrained in any of various manners. As one possibility, the base station may make fewer/weaker accommodations for a wireless device in a cell-edge scenario than for a hardware constrained wireless device, for example since (at least in some instances) a device at cell edge may be only temporarily link budget limited (and thus may be able to successfully perform a RACH procedure at least some of the time even if no accommodation is made) while a hardware constrained wireless device may be permanently link budget limited.

In 606, the base station may respond to the link budget constrained PRACH preamble according to the selected parameters. This may include transmitting the Msg2 using the parameter(s)/characteristic(s) selected for the Msg2, and/or indicating to the link budget constrained wireless device via the Msg2 of the parameter(s)/characteristic(s) selected for the link budget constrained wireless device to use with its Msg3. The wireless device may further follow up by utilizing the indicated parameters (e.g., MCS allocation, TTI-B if enabled, etc.) when transmitting the Msg3 to the base station.

Note additionally that, at least in some instances, a link budget constrained wireless device may explicitly indicate that it is "link budget constrained" in its RRC connection request, for example using a RRC IE and/or a MAC CE. Alternatively or additionally, such an indication may encompass additional characteristics in addition to link budget limitations; for example, an indication of a device class or category (e.g., LTE category 0 devices (or categories 0-1, among various other possibilities), which may be lower complexity, lower performance, and/or lower capability devices relative to other LTE categories) may be indicated with/as part of the RRC connection request, if desired. This may allow the base station (and more generally the network to which the base station belongs) to select further/future communication characteristics with a link budget constrained wireless device that are appropriate to the device in view of its link budget constraints and/or other characteristics.

FIG. 7—Exemplary RRC Connection Request Information Element Format

FIG. 7 illustrates an exemplary RRC connection request IE format that may be used by a wireless user equipment (UE) device, according to some embodiments. It should be noted while the exemplary details illustrated in and described with respect to FIG. 7 may be representative of one possible IE format for a RRC connection request IE, other formats are also possible. Accordingly, the features of FIG. 7 are not intended to be limiting to the disclosure as a whole: numerous variations and alternatives to the details provided herein below are possible and should be considered within the scope of the disclosure.

As shown, the message may include a "ue-Identity" field in which identification information for the UE, such as a S-TMSI, may be provided. As another possibility, a random value may be used in this field.

As shown, the message may also include an "establishmentCause" field in which a reason for attempting to establish a RRC connection may be provided. The values of the "establishmentCause" field may be enumerated, and may include emergency, highPriorityAccess, mt-Access, mo-Signaling, mo-Data, spare3, spare2, and spare1.

As one possibility for explicitly indicating that a UE is link budget limited, a special value in the random value field may be used to indicate that a UE is link budget limited. As another possibility, one (or more) of the spare values in the establishmentCause field may be used to indicate that a UE is link budget limited. For example, as one possibility, the spare3 value could be used to indicate "mt-Access+link budget constrained", the spare2 value could be used to indicate "mo-Signaling+link budget constrained", and the spare1 value could be used to indicate "mo-Data+link budget constrained".

In the following further exemplary embodiments are provided.

One set of embodiments may include a method for a base station configured to serve a cell, comprising: by the base station: detecting a preamble message on a physical random access channel; determining that the preamble message is received from a link budget constrained wireless device; selecting characteristics of a response message based on determining that the preamble message is received from a link budget constrained wireless device; and transmitting the response message to the link budget constrained wireless device using the selected characteristics.

According to some embodiments, wherein determining that the preamble message is received from a link budget constrained wireless device comprises determining that the preamble message does not meet a first correlation threshold and does meet a second correlation, wherein the first correlation threshold is higher than the second correlation threshold.

According to some embodiments, the characteristics of the response message are selected to increase the robustness of the response message.

According to some embodiments, the characteristics of the response message comprise one or more of: an aggregation level of a control channel; a power level of control channel elements associated with the response message; or a modulation and coding scheme of the response message.

According to some embodiments, the characteristics of the response message are selected to increase the robustness of a subsequent message from the link budget constrained wireless device to the base station.

According to some embodiments, the characteristics of the response message comprise one or more of: a modulation and coding scheme grant for the subsequent message from the link budget constrained wireless device; or an indication to use transmission time interval bundling for the subsequent message from the link budget constrained wireless device.

A further set of embodiments may include a base station configured to serve a cell, comprising: a radio; and a processing element operably coupled to the radio, wherein the processing element and the radio are configured to implement any or all parts of any of the preceding method for a base station.

A further exemplary embodiment may include a method for a wireless device, the method comprising: by the wireless device: transmitting a preamble message to a base station on a physical random access channel; receiving a random access response message from the base station; and transmitting a radio resource control connection request using information from the random access response message, wherein the radio resource control connection request indicates that the wireless device is link budget constrained.

According to some embodiments, the random access response message indicates to use transmission time interval bundling for the radio resource control connection request, wherein transmitting the radio resource control connection request uses transmission time interval bundling.

Yet another exemplary embodiment may include a wireless device, comprising: a radio; and a processing element operably coupled to the radio, wherein the processing element and the radio are configured to implement any or all parts of the preceding method for a wireless device.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a base station configured to serve a cell, comprising:
by the base station:
detecting a preamble message on a physical random access channel;
determining that the preamble message is received from a link budget constrained wireless device, wherein determining that the preamble message is received from the link budget constrained wireless device comprises determining that the preamble message does not meet a first correlation threshold and does meet a second correlation threshold, wherein the first correlation threshold is higher than the second correlation threshold;
selecting characteristics of a response message based at least in part on determining that the preamble message is received from the link budget constrained wireless device; and
transmitting the response message to the link budget constrained wireless device using the selected characteristics.

2. The method of claim 1,
wherein the characteristics of the response message are selected to increase the robustness of the response message.

3. The method of claim 1, wherein the characteristics of the response message comprise one or more of:
an aggregation level of a control channel on which the response message is transmitted;
a power level of control channel elements associated with the response message; or
a modulation and coding scheme of the response message.

4. The method of claim 1,
wherein the characteristics of the response message are selected to increase the robustness of a subsequent message from the link budget constrained wireless device to the base station.

5. The method of claim 1, wherein the characteristics of the response message comprise one or more of:
a modulation and coding scheme grant for a subsequent message from the link budget constrained wireless device; or
an indication to use transmission time interval bundling for the subsequent message from the link budget constrained wireless device.

6. The method of claim 1, further comprising:
determining whether the link budget constrained device is at a cell edge based on one or more of time of arrival or round trip delay of the preamble message,
wherein the characteristics of the response message are selected further based on whether the link budget constrained device is at the cell edge.

7. A base station configured to serve a cell, comprising:
a radio; and
a processing element operably coupled to the radio,
wherein the processing element and the radio are configured to:
determine that a preamble message received from a wireless user equipment (UE) device on a physical random access channel does not meet a first correlation threshold and does meet a second correlation threshold, wherein the first correlation threshold is higher than the second correlation threshold;
select characteristics of a response message transmitted to the UE device based on determining that the preamble message is does not meet the first correlation threshold and does meet the second correlation threshold; and
transmit the response message to the UE device using the selected characteristics.

8. The base station of claim 7,
wherein to select the characteristics of the response message, the processing element and the radio are further configured to select an aggregation level of a control channel on which the response message is transmitted, wherein a higher aggregation level is selected based on the preamble message not meeting the first correlation threshold than if the preamble message met the first correlation threshold.

9. The base station of claim 7,
wherein to select the characteristics of the response message, the processing element and the radio are further configured to select a power level of control channel elements associated with the response message, wherein a higher power level is selected based on the preamble message not meeting the first correlation threshold than if the preamble message met the first correlation threshold.

10. The base station of claim 7,
wherein to select the characteristics of the response message, the processing element and the radio are further configured to select a modulation and coding scheme of the response message, wherein a lower modulation and coding scheme is selected based on the preamble message not meeting the first correlation threshold than if the preamble message met the first correlation threshold.

11. The base station of claim 7,
wherein the response message comprises an indication of a modulation and coding scheme grant for a connection request message to be transmitted by the UE device, wherein to select the characteristics of the response message, the processing element and the radio are further configured to select the modulation and coding scheme grant, wherein a lower modulation and coding scheme grant is selected based on the preamble message not meeting the first correlation threshold than if the preamble message met the first correlation threshold.

12. The base station of claim 7,
wherein to select the characteristics of the response message, the processing element and the radio are further configured to select to provide an indication to use transmission time interval bundling for a connection request message to be transmitted by the UE device based on the preamble message not meeting the first correlation threshold.

13. The base station of claim 7, wherein the processing element and the radio are further configured to:
receive an indication in a connection request message received from the UE device that the UE device is link budget constrained; and
select further communication characteristics with the UE device based at least in part on the indication that the UE device is link budget constrained.

14. The base station of claim 7, wherein the processing element and the radio are further configured to:
estimate whether the preamble message does not meet the first correlation threshold because the UE device is at a cell edge or because the UE device is hardware constrained based at least in part on lag in cross-correlation of the preamble message.

15. An apparatus configured for implementation in a base station configured to serve a cell, comprising:
one or more processing elements, wherein the one or more processing elements are configured to:
determine that a preamble message received from a wireless user equipment (UE) device on a physical random access channel does not meet a first correlation threshold and does meet a second correlation threshold, wherein the first correlation threshold is higher than the second correlation threshold;
select characteristics of a response message transmitted to the UE device based on determining that the preamble message is does not meet the first correlation threshold and does meet the second correlation threshold; and
transmit the response message to the UE device using the selected characteristics.

16. The apparatus of claim 15, wherein to select the characteristics of the response message, the one or more processing elements are further configured to select an aggregation level of a control channel on which the response message is transmitted, wherein a higher aggregation level is selected based on the preamble message not meeting the first correlation threshold than if the preamble message met the first correlation threshold.

17. The apparatus of claim 15, wherein to select the characteristics of the response message, the one or more processing elements are further configured to select a power level of control channel elements associated with the response message, wherein a higher power level is selected based on the preamble message not meeting the first correlation threshold than if the preamble message met the first correlation threshold.

18. The apparatus of claim 15, wherein to select the characteristics of the response message, the one or more processing elements are further configured to select a modulation and coding scheme of the response message, wherein a lower modulation and coding scheme is selected based on the preamble message not meeting the first correlation threshold than if the preamble message met the first correlation threshold.

19. The apparatus of claim 15, wherein to select the characteristics of the response message, the one or more processing elements are further configured to select to provide an indication to use transmission time interval bundling for a connection request message to be transmitted by the UE device based on the preamble message not meeting the first correlation threshold.

20. The apparatus of claim 15, wherein the one or more processing elements are further configured to:
estimate whether the preamble message does not meet the first correlation threshold because the UE device is at a cell edge or because the UE device is hardware constrained based at least in part on lag in cross-correlation of the preamble message, wherein said selecting the characteristics of the response message is based on the UE device being at the cell edge or being hardware constrained.

* * * * *